(12) United States Patent
Stanley

(10) Patent No.: US 6,178,102 B1
(45) Date of Patent: *Jan. 23, 2001

(54) REGULATED DC OUTPUT POWER SUPPLY FOR AMPLIFIERS

(75) Inventor: Gerald R. Stanley, Osceola, IN (US)

(73) Assignee: Crown Audio, Inc., Elkhart, IN (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/397,362

(22) Filed: Sep. 16, 1999

Related U.S. Application Data

(60) Provisional application No. 60/100,506, filed on Sep. 16, 1998.

(51) Int. Cl.[7] .............................. H02M 1/12; H02M 1/14; H02M 7/00
(52) U.S. Cl. ................................. 363/44; 363/53; 363/89; 363/70; 323/901
(58) Field of Search ................................... 363/44, 45, 89, 363/50, 53, 67, 69, 70; 323/901, 908

(56) References Cited

U.S. PATENT DOCUMENTS

| | | | |
|---|---|---|---|
| 4,488,211 | * 12/1984 | Miyairi | 363/45 |
| 4,622,629 | 11/1986 | Glennon | 363/70 |
| 4,739,466 | 4/1988 | Glennon et al. | 363/89 |
| 5,460,244 | * 10/1995 | Tanahashi | 363/70 |
| 5,572,417 | * 11/1996 | Vinciarelli et al. | 363/89 |
| 5,668,707 | * 9/1997 | Barrett | 363/44 |
| 5,835,364 | * 11/1998 | Dewinter et al. | 363/45 |
| 5,905,642 | * 5/1999 | Hammond | 363/37 |
| 5,949,221 | * 9/1999 | Edwards | 323/209 |
| 5,949,662 | * 9/1999 | Boldin et al. | 363/37 |
| 5,956,244 | * 9/1999 | Rehm et al. | 363/70 |

OTHER PUBLICATIONS

Front–End Converter System for Distributed Power Supply, S T Hadjivassilev, J. Pforr, L Hobson, School of Science and Technology, University of Teesside, United Kingdom, Published Sep. 13, 1993.

Copy of corresponding patent application International Search Report dated Jan. 21, 2000.

* cited by examiner

Primary Examiner—Peter S. Wong
Assistant Examiner—Bao Q. Vu
(74) Attorney, Agent, or Firm—Baker & Daniels

(57) ABSTRACT

A power supply for supplying a DC voltage from an AC supply voltage provided by an AC voltage source to an amplifier includes a plurality of input lines coupled to the AC voltage source a rectifier coupled to the input lines to provide an unregulated positive DC voltage component and an unregulated negative DC voltage component, first and second regulators coupled to the rectifier and generating controlled positive and negative DC voltage components, and a plurality of output lines coupled to the regulators. The regulators augment the unregulated positive and negative DC voltage components with the controlled positive and negative DC voltage components to create positive and negative DC voltages on the output lines.

30 Claims, 2 Drawing Sheets

REGULATED DC OUTPUT POWER SUPPLY FOR AMPLIFIERS

CROSS-REFERENCE TO RELATED APPLICATIONS

The present application claims priority under 35 U.S.C. 119(e) of Provisional Patent Application Serial No. 60/100,506, filed Sep. 16, 1998, entitled "Power Supply for Amplifiers".

BACKGROUND OF THE INVENTION

1. Field of the Invention.

The present invention relates generally to power supplies and, more particularly, to such a power supply for use with pulse width modulated amplifiers.

2. Description of the Related Art.

Large amplifiers made for magnetic resonance imaging (MRI) gradient amplifiers have often comprised a major portion of the cost of the overall MRI system. As gradient amplifier sizes continue to increase to provide increased functionality for imaging, the size and cost of the amplifier's DC power supplies has likewise risen.

Pulse Width Modulated (PWM) amplifiers offer a very attractive simplification to the DC power supply system in that they typically can share one supply between all three axes of amplifiers, X, Y and Z. Since all three axes are not driven to full capacity at any one time, the aggregate DC supply demand is not three times that of the maximum demand of any one axis. A worst case would be that the total demand is only twice the maximum demand of one axis.

If three separate supplies had been required, the result would be that the system would need to make three supplies of the worst case size to meet any possible demand. Thus it is evident that by sharing supplies the PWM amplifier has reduced the power supply to $\frac{2}{3}$ of the size of designs requiring three separate and isolated supplies. Since the supply is both smaller and simpler, it would be typical that the power supply cost has been halved by supply sharing.

The reason that PWM amplifiers can operate with a shared supply is that they do not require topologies such as grounded bridges which have floating supplies to overcome voltage based limitations of their output power controlling semiconductor devices. When semiconductors are used in non-dissipative modes as switches, they are less limited by voltage induced failures and higher voltages are possible.

The opportunities for optimization do not end with the improvements due to commonality. A further benefit derives when it is noted that the construction of very large amplifiers no longer require the use of galvanic isolation to isolate the output DC potentials from the AC mains potentials. Traditionally, isolation is done in small products to minimize the lethal exposure of users to primary-side power when contacting the secondary side. With a large amplifier having DC outputs of hundreds of volts and hundreds of amps, any direct contact of a user with the secondary side would be fully lethal, whether there were galvanic isolation or not. Safety must be derived by other means.

Strangely, gradient amplifiers have retained the isolated designs that were appropriate for small products in other applications. Galvanic isolation provides no useful feature once AC mains line transients have been filtered and arrested. By continuing to design with galvanic isolation, the cost and size of the supply have been inflated.

Ideally, a gradient amplifier would be operated with two DC supply feeds which are electrically centered (plus and minus voltage) about ground. This allows the amplifier to operate with a no output of zero volts on all of its full-bridge output terminals. Failure to so operate can result in both a hazard to amplifier technicians exposed to net DC voltages on the load when there is no signal and electrolysis within water cooled gradient coils that allow direct impingement of the cooling water with the gradient coils.

Typically, non-galvanically isolated supplies are less expensive to implement than those requiring all power to flow through transformers having isolated primaries and secondaries. Large amounts of unregulated power can be obtained in a non-isolated manner by simply rectifying the AC mains (three-phase). Being three-phase the resultant ripple voltage on the DC output is relatively small compared to the DC component.

If the three-phase input AC power does not provide connection to the neutral feed, all non-isolated full-wave rectifier circuits will of necessity be of classic 6-pulse delta form. If the neutral is provided, the rectifier could also be of 6-pulse wye form with the neutral at DC common potential.

PWM gradient amplifiers do not require power supplies of varying voltages. Ideally, the operating DC voltages are fixed and not subject to variations in line or load. Traditionally, the design of PWM gradient amplifier DC power supplies has in cluded regulating power supplies that would be capable of regulating output voltage over a wide range of voltage. Such regulators are appropriate for laboratory use where the desired voltage can vary from use to use. The only gradient amplifier requirement for diversity of output voltage is to be able to shut-down (zero output volts) when required by fault or safety related conditions .

SUMMARY OF THE INVENTION

The present invention, in one form thereof, involves a regulated power supply for a PWM amplifier. The power supply generates a DC voltage output from an AC voltage input. A significant portion of the DC voltage output is generated by rectifying the AC voltage with the remaining portion of the DC voltage output generated by a regulated power source.

The substance of this invention is that when operating non-galvanically isolated power supplies it is also possible to construct a regulated power supply with only a portion of its power converted by a regulating member, further reducing the cost of implementation. Such practice will also minimize size and maximize power efficiency. Power that is not processed will not likely result in dissipation. The regulating power-processing portions of a power supply are generally the most expensive and lossy per KW processed.

In one example the desired DC supply voltages are just over +/−400 Vdc and the desired AC input voltage is 400 Vac or 480 Vac (delta measured) three-phase. Even with low line voltage (400 Vac−10%) over half of the DC output voltage (and power) is derivable without being regulated or processed other than simply being rectified.

At high line (480 Vac+10%) the net rectified output is still less than the desired DC output voltage. In any case only the difference voltage between the desired output voltages and the available unregulated DC voltages need be processed through regulating converters. The higher the unregulated AC input voltage the less power needs to be processed through the regulating portions of the power supply.

The present invention provides a power supply for supplying a DC voltage from an AC supply voltage provided by an AC voltage source. The power supply comprises a plurality of input lines coupled to the AC voltage source, a rectifier coupled to the input lines, first and second regulators coupled the rectifier and generating controlled positive and negative DC voltage components, and a plurality of output lines coupled the regulators. The rectifier rectifies the AC supply voltage into an unregulated positive DC voltage component and an unregulated negative DC voltage component. The first regulator augments the unregulated positive DC voltage component with the controlled positive DC voltage component to create a positive DC voltage. The second regulator augments the unregulated negative DC voltage component with the controlled negative DC voltage component to create a negative DC voltage. The positive DC voltage and the negative DC voltage are provide on the output lines.

The present invention also provides a power supply for supplying a DC voltage from an AC supply voltage provided by an AC voltage source. The power supply comprises a plurality of input lines coupled to the AC voltage source, a transformer coupled to said input lines, a primary rectifier coupled to said transformer, first and second regulators coupled to said primary rectifier and generating controlled positive and negative DC voltage components, and a pair of output lines coupled to said regulators. The transformer transforms the AC supply voltage to a first AC voltage. The rectifier rectifies the first AC voltage to a first unregulated positive DC voltage component and a first unregulated negative DC voltage component. The first regulator augments the first unregulated positive DC voltage component with the controlled positive DC voltage component to create a positive DC voltage. The second regulator augments the first unregulated negative DC voltage component with the controlled negative DC voltage component to create a negative DC voltage. The positive DC voltage and the negative DC voltage are provided on the output lines.

The present invention also provides an amplifier power supply for supplying a DC voltage from an AC supply voltage. The power supply comprises rectifying means and regulation means connected in series. The rectifying means receives and rectifies the AC supply voltage into an unregulated DC voltage component. The regulation means receives the unregulated DC voltage component from the rectifying means and augments the unregulated DC voltage component with a controlled DC voltage component to provide the DC voltage.

The present invention also provides an amplifier power supply for supplying a DC voltage from an AC supply voltage. The power supply comprises transformer means, rectifying means coupled to the transformer means, and regulation means coupled to the rectifying means. The transformer means transforms the AC supply voltage to a first AC voltage. The rectifying means rectifies the first AC voltage into a first unregulated DC voltage component. The regulation means receives the first unregulated DC voltage component and augments the first unregulated DC voltage component with a controlled DC voltage component to provide the DC voltage.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein.

Figure 1:
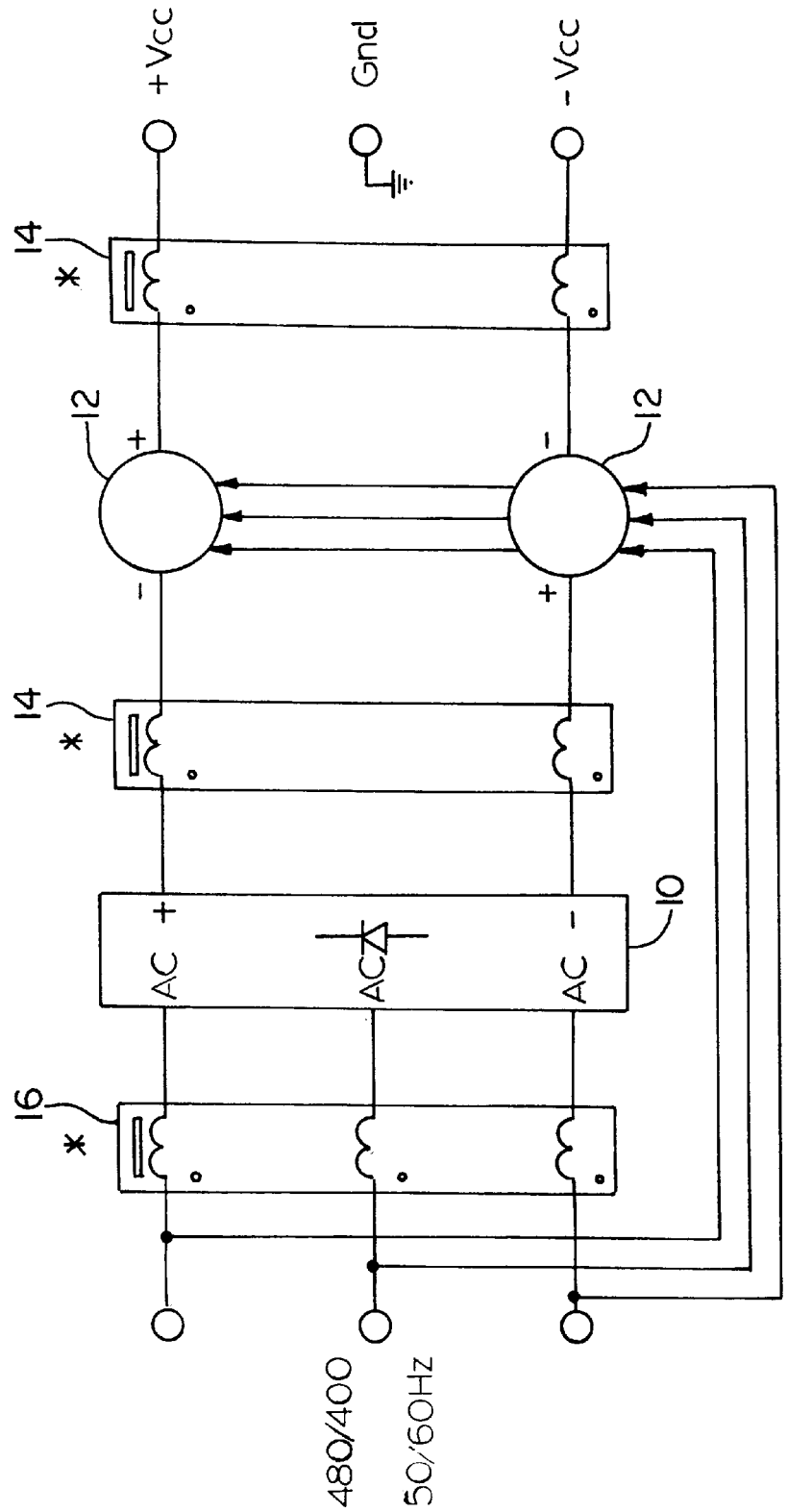
FIG. 1 is a schematic block diagram of a first embodiment of the power supply of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, in several forms, and such exemplifications are not to be construed as limiting the scope of the invention in any manner.

DESCRIPTION OF THE PRESENT INVENTION

The embodiments disclosed below are not intended to be exhaustive or limit the invention to the precise forms disclosed in the following detailed description. Rather, the embodiments are chosen and described so that others skilled in the art may utilize their teachings.

FIG. 1 shows a first embodiment of the present invention. Power is taken from the unregulated three-phase mains and rectified by a 6-pulse delta-derived rectifier 10 creating two unregulated voltages, a positive voltage and a negative voltage. Two isolated regulators 12 add controlled voltages to the unregulated voltages to produce the regulated potentials required to power the PWM gradient amplifiers.

With delta-derived rectifier 10 there will be a common-mode potential AC ripple voltage superimposed on the two unregulated outputs from the rectifiers. The ripple voltage is triangular in waveshape and at triple the AC line frequency. This voltage can be removed from the voltage output regulation accommodation voltage if somewhere in the power chain is there is inserted a common-mode power inductor 14, 16. Possible locations for this component are shown in FIG. 1, but in practice only one of the locations would be used. The common-mode rejection device has two windings (device 14) if it is in the DC portion of the path and three windings (device 16) if it is in the three-phase AC portion of the power path. Each location offers the its own opportunities. Common-mode rejection device 14 with two windings is located either between rectifier 10 and regulators 12 or between regulators 12 and the output. Common-mode rejection device 16 with three windings is located between the input and rectifier 16. Only one common-mode rejection device is needed in the power supply.

Placing common-mode rejection device 16 in the AC input, if one also has a requirement to furnish common-mode surge arresting, provides advantages as this device can soften the inrush currents from common-mode lightning induced transients, etc. The incidental leakage inductance of the device also aids the construction of differential mode arresting circuits at the same location. Placing common-mode rejection device 14 in the DC portion allows the windings to be done with a bifilar winding technique. No similar winding technique is known for trifilar winding. In any case the wire-to-wire voltage is large enough to suggest that separate winding layers would be wise for dielectric strength purpose.

Figure 2:
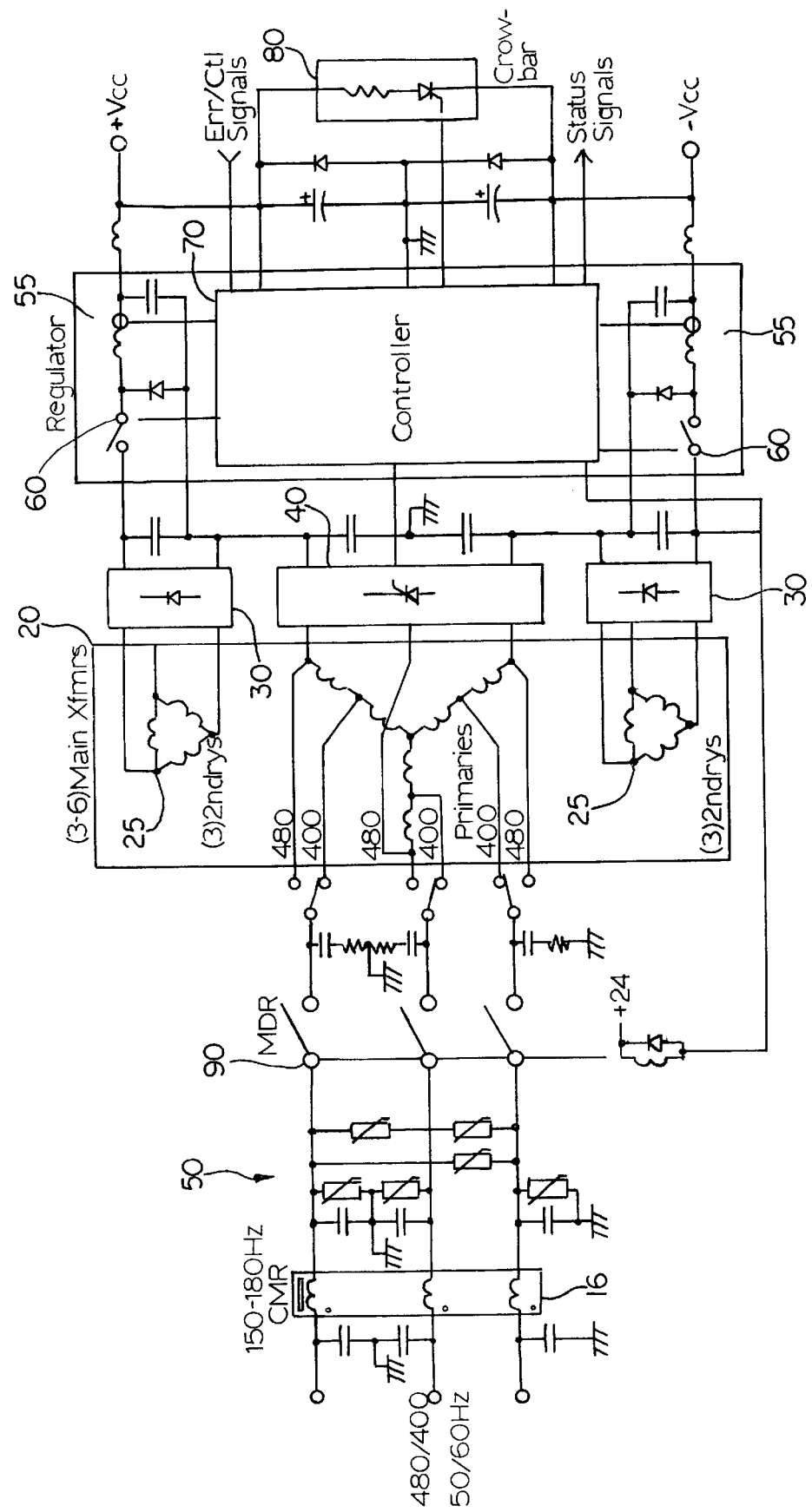
FIG. 2 is a schematic block diagram of a second embodiment of the power supply of the present invention.

FIG. 2 shows a second embodiment of the present invention which allows for better accommodation of 400 Vac in a system optimized for 480 Vac input. Autoformers 20 are coupled between the three-phase mains inputs and rectifier 40. By using low-turns-ratio step-up autoformers 20 400 Vac is converted to 480 Vac before rectification. When this approach is taken it may also be expedient to power the regulating supplies by secondaries 25 placed on the autoformers (now transformers). Autoformers are always smaller than transformers for processing any given amount of power. The closer to 1:1 turns-ratio, the smaller the autoformer needs to be as most of the power is passed directly from the input to the output without processing through the magnetic circuit.

Six varistors 50 are shown connected across all three-phase lines and from all three-phase lines to ground. This prevents destructive levels of voltage from reaching the rest of the power supply. Such apparatus would be common in a power conditioning unit which would precede a traditional gradient power supply. In this case all of the functions are being integrated into one package to reduce redundancy and system cost. Also, inductive filter 16 is used to eliminate the common mode AC ripple voltage.

The power quality of the converter can be improved if the power of the regulating portions of the supply is drawn in the opposite manner as is the rectified DC output power. In FIG. 2 the rectified DC output is delta-derived which means that the power to the regulated portions would best be reflected to the AC mains as wye-derived. This will minimize the harmonic content for the system compared to having drawing all of the power in either delta or wye form. If the power drawn from the two portions were equal the result would be a classic 12-pulse rectifier which produces better power quality. In this case it is evident that increasing the design efficiency, which implies the minimization of the processed portion of the output power, will tend to produce a power consumption which is dominantly 6-pulse and thus of lower quality than a classic 12-pulse.

Power quality can be optimized by forcing the regulating portions of the supply to produce input current waveforms which minimize AC line harmonics. In general, such a control strategy will not increase power efficiency internal to the supply or reduce the cost of materials. Optimizing the line current waveforms (making them sinusoidal) will require the control of stored energy reserves allowing energy to return to the AC line. Such regulators are inherently more costly.

In FIG. 2 the isolated regulators 55 are shown as buck converters with high-frequency PWM controlled switches 60 that act to control the output voltages using current and voltage feedback from the converter outputs. Excessive current will result in self-protection of the regulator. Excessive output voltage monitored by controller 70 will completely block the switching of these regulators and the controller will fire the protective crowbar 80 placed across both outputs. Overvoltage can destroy the amplifier. Error and control signals containing other errors or unsafe conditions such as a supply fault or an open cabinet door are inputs to controller 70 and can also elicit the firing of the crowbar. Controller 70 outputs status signals for use outside of the power supply. The crowbar resistor has sufficient joule storage capability to be able to absorb the entire energy of the main output capacitors which are very large. Controller 70 also controls rectifier 40 SCR's so that other fault conditions may cause controller 70 to activate rectifier 40 and short autoformers 20.

To allow for fault protection it is necessary that all of the power flows from the AC input to the DC output be interrupted. While switch 90 with three common contacters is used to interrupt the AC supply voltage, faster response can be provided by using a controlled form of rectifiers 40 for the unregulated portion of the supply. The regulating portions of the supply passing through rectifiers 30 can be implicitly interrupted if they are of a buck-derived circuit form as such would require no unusual features to support fault protection.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains. The invention is not to be limited to the details above given but may be modified in accordance with the following claims.

What is claimed is:

1. A power supply for supplying a DC voltage from an AC supply voltage provided by an AC voltage source comprising:

a rectifier adapted to be coupled to the AC supply voltage to rectify the AC supply voltage to an unregulated DC voltage component which is positive relative to earth and an unregulated DC voltage component which is negative relative to earth; and a first and second regulator coupled to said rectifier, said first regulator regulating only a portion of said unregulated positive DC voltagze component to augment said unregulated positive DC voltage component with a controlled positive DC voltage component, thereby creating a positive DC voltage, said second regulator regulating only a portion of said unregulated negative DC voltage component to augment said unregulated negative DC voltage component with a controlled negative DC voltage component, thereby creating a negative DC voltage.

2. The power supply of claim 1, further comprising an inductive filter to filter a common mode signal frequency produced by the AC supply voltage.

3. The power supply of claim 2, wherein said inductive filter is coupled between the AC supply voltage and said rectifier.

4. The power supply of claim 2, wherein said induction filter is coupled between said rectifier and said regulators.

5. The power supply of claim 2, wherein said induction filter is coupled to the output of said regulators.

6. The power supply of claim 1, wherein said regulators are powered by the AC supply voltage.

7. The power supply of claim 1, wherein said rectifier is a 6-pulse rectifier.

8. A power supply for supplying DC voltage from an AC supply voltage comprising:

a transformer coupled to the AC supply voltage to transform the AC supply voltage to a first AC voltage;

a primary rectifier coupled to said transformer to rectify said first AC voltage to a first unregulated DC voltage component which is positive relative to earth and a second unregulated DC voltage component which is negative relative to earth;

a first and second regulator coupled to said primary rectifier, said first regulator regulating only a portion of said first unregulated DC voltage component to augment said first unregulated DC voltage component by generating a controlled positive DC voltage component, thereby creating a positive DC voltage; said second regulator regulating only a portion of said second unregulated DC voltage component to augment said second unregulated DC voltage component by generating a controlled negative DC voltage component, thereby creating a negative DC voltage.

9. The power supply of claim 8, wherein said transformer includes a first and second secondary winding to power said regulators.

10. The power supply of claim 9 further comprising a first secondary rectifier coupled to said first secondary winding to provide a third unregulated DC voltage component which is positive relative to earth to said first regulator and a second secondary rectifier coupled to said second secondary winding to provide a fourth unregulated DC voltage component which is negative relative to earth to said second regulator.

11. The power supply of claim 8, further comprising a controller coupled to said first and second regulator to monitor for fault conditions.

12. The power supply of claim 11, further comprising a first switch coupled to input lines connected to said transformer and operated by said controller to interrupt said AC supply voltage to said transformer during a fault condition.

13. The power supply of claim 11, further comprising an error/control signal input to said controller and a status signal output from said controller.

14. The power supply of claim 8, wherein said transformer includes autoformers.

15. The power supply of claim 8, further comprising an inductive filter to filter a common mode signal frequency produced by the AC supply voltage.

16. The power supply of claim 8, further comprising a plurality of varistors connecting all said input lines and from all said input lines to ground to prevent excessive voltages from damaging said power supply.

17. The power supply of claim 8, wherein said regulators are buck converters.

18. The power supply of claim 8, wherein said plurality of inputs lines includes three lines to connect to a three-phase AC voltage source.

19. An amplifier power supply for supplying a DC voltage from an AC supply voltage comprising:
   rectifying means for rectifying the AC supply voltage into an unregulated DC voltage component which is referenced to ground, and
   regulation means coupled to said rectifying means for receiving said unregulated DC voltage component from said rectifying means and regulating only a portion of said unregulated DC voltage component to augment said unregulated DC voltage component with a controlled DC voltage component, thereby producing a DC voltage.

20. The power supply of claim 19, further comprising an inductive means for filtering a common mode signal frequency produced by the AC supply voltage.

21. The power supply of claim 19, wherein said DC voltage includes a positive DC voltage and a negative DC voltage.

22. An amplifier power supply for supplying a DC voltage from an AC supply voltage comprising:
   transformer means for transforming the AC supply voltage to a first AC voltage;
   rectifying means coupled to said transformer means for rectifying said first AC voltage into a first unregulated DC voltage component which is referenced to ground; and
   regulation means coupled to said rectifying means for receiving said first unregulated DC voltage component and regulating; only a portion of said first unregulated DC voltage component to augment said first unregulated DC voltage component with a controlled DC voltage component, thereby providing said DC voltage.

23. The power supply of claim 22, further comprising an inductive means for filtering a common mode signal frequency produced by the AC supply voltage.

24. The power supply of claim 22, further comprising a controller to operate said rectifying means and said regulation means.

25. The power supply of claim 24, further comprising switch means for interrupting the AC supply voltage to said transformer means, said controller operates said switch means.

26. The power supply of claim 22, wherein said transformer means including a secondary transformer means for producing a second AC voltage.

27. The power supply of claim 26, further comprising at least one secondary rectifying means for rectifying said second AC voltage into a second unregulated DC voltage component provided to said regulation means.

28. A power supply for supplying DC voltage from an AC supply voltage comprising:
   transforner coupled to the AC supply voltage to transform the AC supply voltage to a first AC voltage;
   a primary rectifier coupled to said transformer to rectify said first AC voltage to a first unregulated positive DC voltage component and a first unregulated negative DC voltage component;
   a first and second regulator coupled to said primary rectifiers said first regulator augmenting said first unregulated positive DC voltage component by generating a controlled positive DC voltage component to create a positive DC voltage; said second regulator augmenting said first unregulated negative DC voltage component by generating a controlled negative DC voltage component to create a negative DC voltage;
   a controller coupled to said first and second regulators to monitor for fault conditions; and
   a protective crowbar coupled to said output lines and operated by said controller.

29. A power supply for supplying DC voltage from an AC supply voltage comprising:
   a transformer coupled to the AC supply voltage to transform the AC supply voltage to a first AC voltage;
   a primary rectifier coupled to said transformer to rectify said first AC voltage to a first unregulated positive DC voltage component and a first unregulated negative voltage component; and
   a first and second regulator coupled to said primary rectifier, said first regulator augmenting said first unregulated positive DC voltage component by generating a controlled positive DC voltage component to create a positive DC voltage; said second regulator augmenting said first unregulated negative DC voltage component by generating a controlled negative DC voltage component to create a negative DC voltage;
   said transformer including first and second sets of contacts said first set of contacts routing said AC supply voltage through said transformer to transform said AC supply voltage into said first AC voltage, the second set of contacts directly coupling the AC supply voltage to said primary rectifier.

30. The power supply of claim 29, further including a second switch with a plurality of contacts coupled to said input lines and said transformer to select one of said sets of contacts to electrically couple to said input lines.

* * * * *